United States Patent [19]
Tasso

[11] Patent Number: 5,307,604
[45] Date of Patent: May 3, 1994

[54] SYNTHETIC SHAKE SHINGLE

[75] Inventor: Joseph A. Tasso, Orange, Calif.

[73] Assignee: Lewis Akmakjian, Burbank, Calif.

[21] Appl. No.: 941,980

[22] Filed: Sep. 8, 1992

Related U.S. Application Data

[62] Division of Ser. No. 568,967, Aug. 17, 1990, abandoned.

[51] Int. Cl.$^5$ .............................................. B29C 51/00
[52] U.S. Cl. ............................... 52/745.19; 264/109; 264/257; 264/319; 264/DIG. 31
[58] Field of Search .......................... 52/309.1, 745.19; 264/109, 128, 257, 319, 333, 115, 116, 328.1, DIG. 31

[56] References Cited

U.S. PATENT DOCUMENTS

| | | | |
|---|---|---|---|
| 1,063,579 | 6/1913 | Myers et al. | 264/308 |
| 3,256,219 | 6/1966 | Will | 264/41 |
| 3,830,687 | 8/1974 | Re et al. | 52/309.15 |
| 4,161,471 | 7/1979 | Kassal | 525/40 |
| 4,394,418 | 7/1983 | Temple | 428/391 |
| 4,619,954 | 10/1986 | Warner, II | 428/98 |

*Primary Examiner*—Michael Safavi
*Attorney, Agent, or Firm*—Christie, Parker & Hale

[57] ABSTRACT

A synthetic fire resistant and flame retardant shake shingle suitable for roofing construction is formed of a water-extended polyester resin that has been molded to the shape of a shake shingle and dried to form a semi-rigid, cellular lightweight structure containing a filler of fiberglass pieces substantially uniformly dispersed throughout the cross section of the molded and dried polyester resinous structure. In one embodiment, the ratio of polyester resin to fiberglass pieces to water in the molding formulation is about 3 to about 2 to about 5.5. In an alternative form of the invention, the fiberglass pieces are replaced with a coarse fiberglass mat impregnated with the polyester material to form a core of the resulting shake shingle.

10 Claims, 1 Drawing Sheet

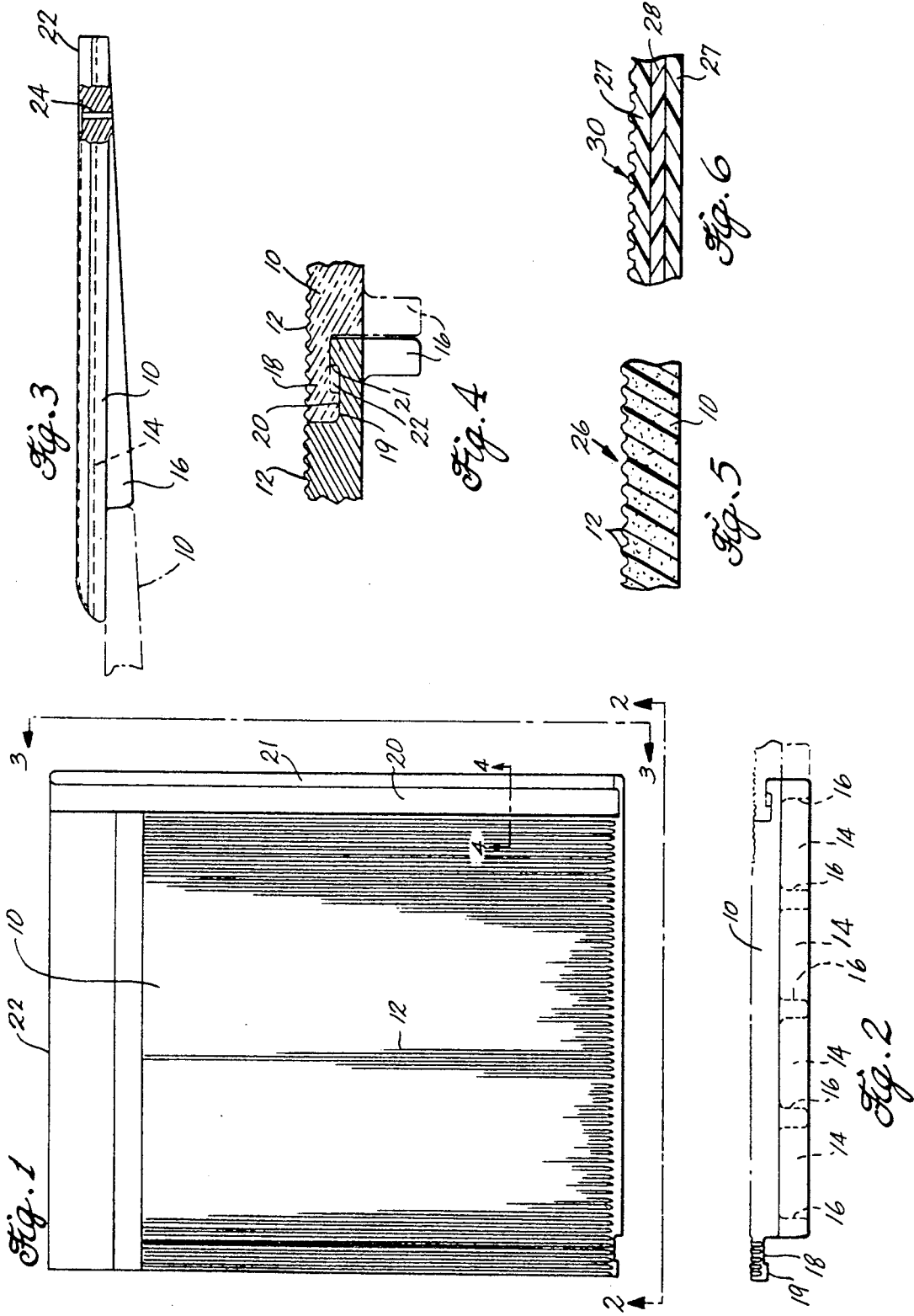

SYNTHETIC SHAKE SHINGLE

This is a division of application Ser. No. 07/568,967 filed Aug. 17, 1990 now abandoned.

FIELD OF THE INVENTION

This invention relates to flame retardant and fire resistant roofing materials, and more particularly, to a synthetic shake shingle that provides many advantages over conventional wood shake shingles and the more recently developed synthetic or concrete shake shingles intended to simulate or provide alternatives for wooden shakes.

BACKGROUND OF THE INVENTION

Wooden shake shingles have been extremely popular for many years in the building and construction industries, especially for home construction. However, houses with roofs made of wooden shake shingles are a serious fire hazard. In residential areas such as mountain and canyon areas, brush areas and the like, wooden shake shingle roofs are often banned by local government authorities. In fact, there are many instances of residential home fires which have destroyed houses with wooden shake shingle roofs, whereas other houses having fire retardant shingles, such as concrete shakes, have survived the same fires.

Because of the need for a fire resistant and flame retardant substitute for wooden shake shingles, the roofing industry has in recent years witnessed the development of synthetic shake shingles in many forms. In some instances, synthetic shake shingles are intended to closely simulate wooden shakes so they can be cut, nailed or otherwise handled in the same manner as wooden shakes. However, these products, and particularly concrete shake shingles, still suffer from a number of drawbacks. Although synthetic shake shingles can be flame retardant and fire resistant, they are often not easy to install on the roof, and they can add a tremendous amount of weight to the roof when compared with wooden shakes, often requiring additional reinforcement to the roof substructure. They are also prone to chip or crack which can be a problem particularly when a homeowner who is not an experienced roofer needs to walk on the roof.

SUMMARY OF THE INVENTION

The present invention provides a synthetic fire resistant and flame retardant shake shingle suitable for roofing construction which overcomes the disadvantages of prior art synthetic shake shingles, particularly concrete shakes.

Briefly, in one embodiment of the invention, a synthetic shake shingle is formed of a composite material of generally uniform cross-sectional composition made from a water extended polyester resin molded to the shape of shake shingle and dried to form a semi-rigid, cellular lightweight structure containing a filler of fiberglass pieces substantially uniformly dispersed and embedded throughout the cross section of the molded and dried polyester resinous structure.

The resulting synthetic shake shingle is surprising in its ability to provide superior thermal and structural capabilities while avoiding nearly all of the recognized disadvantages of prior art synthetic shake shingles. The invention simulates wooden shake shingles in appearance, it is highly flame retardant and fire resistant, reasonably inexpensive to manufacture, and a roof made from the shingles is extremely waterproof. The shingles are also very light in weight when compared with conventional concrete shakes, and as a result, no additional reinforcement is required to use the shingles on a house of conventional framing construction. The shingles are easy to install on a roof, they do not warp when subjected to extremes of temperature, and they are of high strength, making it possible to easily walk on the roof without cracking or chipping the shingles.

These and other aspects of the invention will be more fully understood by referring to the following detailed description and the accompanying drawings.

BRIEF DESCRIPTION OF THE DRAWINGS

FIG. 1 is a top plan view illustrating one embodiment of a shake shingle useful in roofing construction;

FIG. 2 is an elevational view taken on line 2—2 of FIG. 1;

FIG. 3 is a side elevational view taken on line 3—3 of FIG. 1, showing the shingle used in a typical roofing construction;

FIG. 4 is an enlarged fragmentary cross sectional view taken on line 4—4 of FIG. 1;

FIG. 5 is a fragmentary cross-sectional view schematically illustrating the composition of one embodiment of the invention; and FIG. 6 is a fragmentary cross-sectional view schematically illustrating an alternative composition of the invention.

DETAILED DESCRIPTION

FIGS. 1 through 4 illustrate a flame retardant and fire resistant synthetic shake shingle 10 which can be in many configurations, one of which is shown in the figures as an example only. The illustrated shake shingle has a ribbed upper surface 12 and recessed regions 14 which open downwardly and are spaced apart along the width of the shingle, separated by long, parallel ribs 16. An overhang 18 extends along one edge of the shingle. The overhang has a downwardly projecting ridge 19. The overhang interlocks with an adjacent shingle having a recessed interlocking region 20 along the opposite edge of the shingle. An upwardly projecting ridge 21 extends along the outer edge of the recessed region 20. The shingle also has a flat rear portion 22 which is overlapped by a shingle to the rear as illustrated in FIG. 3.

When shingles identical to the shingle 10 are overlaid and interlocked to form a shingled roofing construction, adjacent shingles are overlapped, as illustrated in FIG. 3, and are interlocked laterally, as illustrated in FIG. 4. A lateral offset space 22 is left between the adjacent edges of the ridges 19 and 21 to accommodate thermal expansion or possible shrinkage of the roofing material.

One or more nail holes 24 are formed in the rear, outer section of the shingle for use in nailing or stapling the shingle to a roof substructure.

The shake shingle is made from a water extended polyester resin in which the resin is mixed with water and the resulting resin-water emulsion is then mixed with a fire resistant and flame retardant filler. The preferred filler comprises chopped pieces of fiberglass matte. A particular fire retardant material such as hydrated aluminum also can be added to the mixture. Various pigments can be added to the resinous mixture for coloration of the finished product. The chopped fiberglass pieces are uniformly dispersed in the resinous mixture. A catalyst for curing the resin is injected into the resinous mixture prior to injecting the mixture into a mold shaped as a shake shingle. The mixture cures in the mold and dehydrates to form a hardened shake shingle. The water-extended polyester resin is mixed with a sufficient amount of water in the first step of the process so that a controlled level of strength is produced in the finished product necessary for the shingle to serve as a roofing material. The curable resin dehydrates in the mold and forms a cellular lightweight shingle structure in which the chopped fiberglass pieces are uniformly dispersed throughout the cross section of the shingle. This form of the shingle composition is illustrated schematically at 26 in FIG. 5.

The thermal barrier structure of the shingle is composed principally of a water-extended polyester resin. These resins, which are suitable for use in the present invention, are described, for example, in U.S. Pat. Nos. 3,836,687 and 3,256,219 to Re, which are incorporated herein by this reference. The water-extended polyester resin, when cured, forms internal pores or cells dispersed throughout the cross section of the shingle. These pores or cells contain water, but the resin plastic material progressively dehydrates over time after molding and curing and produces a lightweight, internally cellular, semi-rigid structure essentially free of water. The plastic structure shrinks to some extent during dehydration; curing can be carried out under elevated temperatures to enhance dehydration so that shrinkage of the shingle is minimized once the product is ready for use. The preferred water-extended polyester resin is sold under the designation Aropol WEP 662P polyester resin sold by Ashland Chemical Co. When hardened, this resin forms a closed cell foam. In a preferred embodiment, the polyester resin-water emulsion contains about 60% to about 65% water. Upon curing and dehydration and when mixed with other components of the preferred formulation, the shingle surprisingly has extremely good strength as well as other useful properties described below.

The filler mixed with the resin-water emulsion is preferably a particulate flame retardant and fire resistant material that adds bulk to the resin while also enhancing the structural properties, particularly strength, of the finished product. A desirable filler comprises pieces of chopped fiberglass matte added in the range of about 15% to about 25% by weight of the resin-water-fiberglass mixture. The fiberglass pieces are uniformly dispersed in the emulsion preferably with a high shear mixer. The resinous mixture impregnates the fiberglass pieces, and when the resin is cured the fiberglass filler provides a level of elasticity that reduces warping of the shingle.

Other components of the shingle composition will be described in connection with the following example of an experimental shake shingle produced in accordance with principles of this invention.

The formula was as follows:
(1) 3 lbs. water-extended polyester resin, Aropol WEP 662P
(2) 2 lbs. chopped fiberglass pieces in a size range of about ⅛ in. to about ¼ in.
(3) 0.25 lbs. brown oxide (pigmentation)
(4) 1.5 lbs. hydrated alumina (fire retardant)
(5) 5.5 lbs. water
(6) Ethyl acetate (as needed during process)
(7) Catalyst-Lupersol DSW (Pennwalt-Lucidol)

Components (1) through (5) were mixed in a high shear airless mixing machine, such as the Ashland mixer for WEP resin systems, sold by Ashland Chemical Co. Ethyl acetate (6) and catalyst (7) can either be added via a mixing nozzle or put in the water side of the mixing machine in which case the catalyst strength must be continually monitored. In a preferred form of carrying out the invention, the resin is pumped through the continuous mixing machine with catalyzed water to produce a fluid emulsion with a gel time of approximately 2 to 4 minutes. The material was then injected under pressure into a closed vented sculptured mold in the shape of a shake shingle. This shake shingle was different in shape from the shake shingle illustrated in the drawings. The material in the mold was cured by adding heat to the mold through a heat tunnel. Shocking the resinous mixture with heat during curing drives out the water from the resulting foam structure and minimizes subsequent shrinkage of the finished product. Curing alternatively can be at ambient temperatures but the product must remain in the mold and not be put into use until a longer curing time has elapsed so as to minimize shrinkage during use. The resulting shingle had a size of approximately 4 ft. by 14 in., a thickness of about ¾ in. and a weight of approximately 1½ lbs. It is desirable that the shake shingle have a thickness from about ¾ in. to about one inch uniformly across its cross section in order to maintain structural properties of the shingle.

When the shake shingle has cured and is removed from the mold, the finished product is a synthetic fire resistant and flame retardant shingle suitable for roofing construction in which substantially the entire cross section of the finished shingle consists essentially of a semi-rigid lightweight closed cell polyester foam structure containing the filler of fiberglass pieces substantially uniformly dispersed throughout the cross section of the dried and hardened polyester resinous structure.

FIG. 6 illustrates an alternative form of the invention in which the chopped fiberglass pieces are replaced with a coarse fiberglass mat impregnated with the water-extended polyester resin so the fiberglass forms a core of the resulting shake shingle. In this embodiment, a coarse fiberglass mat 28 approximately ⅛ in. to 3/16 in. in thickness is placed in the mold and the water-extended resinous material 27, such as the formulation described in the previous example (omitting the chopped fiberglass pieces) is poured into the mold so as to surround the fiberglass mat. The resinous material becomes impregnated into the fiberglass mat and the mat has coarse fibers projecting outwardly from all sides which become embedded in the finished shingle product 30.

The fiberglass mat is surrounded on all sides by the cured porous semi-rigid polyester resin structure when dehydration is complete.

The fiberglass mat adds bulk to the finished shingle and forms a lightweight flame retardant and fire resistant core of the finished shingle which also enhances flexibility of the finished shingle to the extent that the shingle resists warping and cracking during use.

In a roof of a house constructed from the synthetic shake shingles described in the previous example, it was discovered that a superior thermal barrier was produced. In this experimental test of the invention, temperatures of 97° F. outside the house produced an inside temperature of only 72° F.; in another experimental use outside temperatures of 95° F. resulted in a 70° F. steady temperature within the house. The shingles also have the property that high external heat has a tremendous tendency to make the semi-rigid shingles lie flat on the roof. No reinforcement or reroofing structures are needed, the shingles are lightweight and less than 350 lbs. per square, they are durable in that they are dry rot and termite proof, they do not crack by walking on the roof, and they have sustained experimental wind and rain testing at 100 mph.

What is claimed is:

1. A method for making a synthetic fire resistant and flame retardant shake shingle suitable for roofing construction including the steps of mixing a water-extended polyester resin with water to form a viscous emulsion, adding chopped fiberglass pieces and a separate particulate fire retardant material different from the fiberglass to the polyester-water emulsion and mixing in a high shear mixer to uniformly disperse the fiberglass pieces and the fire retardant material throughout the emulsion, injecting a catalyst into the polyester-water emulsion to form a curable resin consisting essentially of the polyester resin-water emulsion with the uniformly dispersed chopped fiberglass pieces and particulate fire retardant material, immediately pouring the resulting curable resin into a mold having the shape of a shingle to harden the mixture to form a molded shingle, and thereafter removing the shingle from the mold to provide a roofing shingle in which essentially the entire cross section of the shingle is formed of the polyester resin which has been molded to the shingle shape and dried to form a semi-rigid, cellular lightweight structure containing the filler of fiberglass pieces and fire retardant material substantially uniformly dispersed throughout the entire cross-section of the polyester resinous structure.

2. The method according to claim 1 in which the ratio of the polyester resin to fiberglass pieces to water in the molding formulation is about 3 to about 2 to about 5.5.

3. The method according to claim 1 in which the resulting shingle has a weight of less than about 350 pounds per square.

4. The method according to claim 1 in which the polyester resin-water emulsion contains about 60 percent to about 65 percent water by weight.

5. The method according to claim 4 in which the fiberglass pieces are added to the mixture in a range from about 15 to 25 percent of the combined weight of the polyester resin, water and fiberglass pieces.

6. The method according to claim 5 in which the size of the fiberglass pieces is substantially within the range of about ⅛ inch to ¼ inch, and the shingle thickness is in the range of about ¾ inch to 1 inch.

7. The method according to claim 1 in which the resin is pumped through a continuous mixer with catalyzed water to produce a fluid emulsion with a short gel time in the range of about two to about four minutes, and then immediately pouring the catalyzed mixture into a mold.

8. The method according to claim 7 in which the mixture is pumped into a closed vented mold and the resulting molded mixture is dehydrated by application of external heat to the mold.

9. The method according to claim 1 in which the mixture is pumped into a closed vented mold and the resulting molded mixture is dehydrated by application of external heat to the mold.

10. A method for making a synthetic fire resistant and flame retardant shake shingle suitable for roofing construction comprising the steps of mixing a water-extended polyester resin with water to form a viscous emulsion, mixing a fine particulate fire retardant material with the polyester-water emulsion via a high shear mixer to uniformly disperse the fire retardant material throughout the mixture, placing a coarse fiberglass mat in a center portion of a mold shaped as a roofing shingle, injecting a catalyst into the polyester-water emulsion to form a curable resinous material consisting essentially of the polyester resin-water emulsion with uniformly dispersed fine particulate fire retardant material, pouring the curable resinous material into the mold and around the fiberglass mat to impregnate the mat and embed the mat in the curable material, thereafter allowing the material to cure and thereby form a semi-rigid, cellular lightweight structure with the fiberglass mat embedded in a central portion of its cross section, and removing the resulting molded and hardened shake shingle from the mold.

* * * * *